United States Patent
Han (10) Patent No.: US 8,023,948 B2
(45) Date of Patent: Sep. 20, 2011

(54) VERTICAL HANDOVER METHOD FOR OVERLAY COMMUNICATION SYSTEM

(75) Inventor: Jung Hoon Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 985 days.

(21) Appl. No.: 11/862,714

(22) Filed: Sep. 27, 2007

(65) Prior Publication Data

US 2008/0085712 A1    Apr. 10, 2008

(30) Foreign Application Priority Data

Oct. 10, 2006  (KR) .................. 10-2006-0098235

(51) Int. Cl.
*H04W 36/00* (2009.01)

(52) U.S. Cl. ...... 455/440; 455/41.2; 455/41.3; 455/436; 455/437; 455/438; 455/439; 455/441; 455/442; 455/443; 455/444; 455/450; 455/451; 455/452.1; 455/453; 455/552.1; 455/553.1; 370/328; 370/331; 370/332; 370/333; 370/334; 370/338

(58) Field of Classification Search ............... 455/41.2, 455/41.3, 436–444, 450–453, 552.1, 553.1; 370/328, 331–334, 338
See application file for complete search history.

(56) References Cited

U.S. PATENT DOCUMENTS

| | | | | |
|---|---|---|---|---|
| 5,640,674 A * | 6/1997 | Dixon | ........................... | 370/335 |
| 5,749,055 A * | 5/1998 | Dahlin | ........................ | 455/453 |
| 6,055,428 A * | 4/2000 | Soliman | ........................ | 455/437 |
| 6,061,337 A * | 5/2000 | Light et al. | ...................... | 370/331 |
| 6,181,943 B1 * | 1/2001 | Kuo et al. | ...................... | 455/437 |
| 6,351,642 B1 * | 2/2002 | Corbett et al. | ................ | 455/442 |
| 6,591,103 B1 * | 7/2003 | Dunn et al. | .................... | 455/436 |
| 6,714,789 B1 * | 3/2004 | Oh et al. | .................... | 455/456.1 |
| 7,260,399 B1 * | 8/2007 | Oh et al. | ........................ | 455/436 |

FOREIGN PATENT DOCUMENTS

| | | |
|---|---|---|
| KR | 2001-0108453 | 12/2001 |
| KR | 1020050120293 | 12/2005 |
| KR | 1020060024731 | 3/2006 |
| KR | 1020060032466 | 4/2006 |
| KR | 1020060050576 | 5/2006 |

\* cited by examiner

*Primary Examiner* — Steve D Agosta (74) *Attorney, Agent, or Firm* — The Farrell Law Firm, P.C.

(57) ABSTRACT

A vertical handover method in a heterogeneous overlay network communication system is provided. A vertical handover method for an overlay communication system including a plurality of base stations each serving at least one communication network technology to a mobile terminal includes determining whether a mobile terminal is located in a measurement region with reference to a vertical handover map in relation to a serving base station; detecting reachable base stations by activating all network interfaces when the mobile terminal locates in a measurement region; selecting one of the reachable base stations as a handover target base station; determining if the mobile terminal is located in a handover region with reference to the vertical handover map; and performing a handover if the mobile terminal is located in a handover region.

6 Claims, 4 Drawing Sheets

VERTICAL HANDOVER METHOD FOR OVERLAY COMMUNICATION SYSTEM

PRIORITY

This application claims priority to an application entitled "VERTICAL HANDOVER METHOD FOR OVERLAY COMMUNICATION SYSTEM" filed in the Korean Intellectual Property Office on Oct. 10, 2006 and assigned Serial No. 2006-0098235, the contents of which are hereby incorporated by reference.

BACKGROUND OF THE INVENTION

1. Field of the Invention

The present invention relates to a mobile communication system and, in particular, to a vertical handover method in a heterogeneous overlay network.

2. Description of the Related Art

In multiple access wireless communication systems, a mobile terminal is handed over from one cell to another to maintain a radio connection with the network. Typically, a handover occurring between different access nodes that use the same technology is referred to as a horizontal handover. Unlike the horizontal handover, a vertical handover occurs between different access nodes that use different technologies. Nowadays, there exist various cellular communication network technologies such as a Universal Mobile Telecommunication Service (UMTS), a Code Division Multiple Access 2000 (CDMA2000), a Global System for Mobile communication (GSM), and a General Packet Radio Services (GPRS), and Internet Protocol (IP) based networks such as a World Interoperability for Microwave Access (WiMAX), a Wireless Local Area Network (WLAN), and a Wireless Personal Area Network (WPAN). In order to support interoperability between such heterogeneous communication networks, various vertical handover technologies have been developed.

Unlike the conventional horizontal handover in which a handover is determined on the basis of the location of the mobile terminal, the vertical handover is determined based on of various decision factors as well as the location of the mobile terminal.

Typically, the location of the mobile terminal is estimated by measuring a Received Signal Strength (RSS) transmitted by a base station. In this case, the handover is determined when a value of the RSS is less than a predetermined threshold value.

Another approach for determining a handover is to use a beacon frame, in which the handover is determined when a beacon is received from a neighbor base station. In this case, the mobile terminal determines that it has entered another network, when a new beacon frame is received.

Since different types of networks are overlaid in the heterogeneous network environment, various factors for determining the handover are required in addition to a determination based on the RSS. The handover determination factors include a required service characteristic, a network utilization cost, a network state, a mobile state, and a user preference. The service characteristic refers to service stability, a propagation delay, and data transmission, and the network utilization cost means a charge accounting method. The network state is represented by types of traffic, available bandwidth, packet loss, and the like; and the mobile state refers to a moving pattern, moving speed, and mobility information. The user preference is a factor that can be included by a user's request.

In the location-based vertical handover, the handover determination is made only on the basis of the location of the mobile terminal without taking into consideration the network complexity and the types of traffic of the heterogeneous network overlay environment, resulting in inefficient network resource management.

Also, the conventional vertical handover methods are designed without taking into consideration the service quality required by users and the charge accounting method, divesting the user of chance for saving communication costs.

Also, the various decision factors-based conventional vertical handover methods are designed under a lot of assumptions or require restructuring the current networks, resulting in additional infrastructure costs.

Furthermore, the conventional vertical handover methods are disadvantageous in that the mobile terminal need to have multiple network interfaces for supporting the vertical handover, and collect information on all of the networks, resulting in increases of the overall manufacturing costs and in power consumption.

SUMMARY OF THE INVENTION

The present invention has been made in an effort to solve at least the above problems, and it is an aspect of the present invention to provide a vertical handover method that is capable of simplifying a handover determination complexity by determining a handover using a handover map established while taking into consideration the traffic load of networks as well as the location of a mobile terminal.

It is another aspect of the present invention to provide a vertical handover method that is capable of avoiding concentration of handover traffics to one network.

It is another object of the present invention to provide a vertical handover method that enables a fast handover by adaptively estimating the location of a mobile terminal and traffic load of a network.

It is another aspect of the present invention to provide a vertical handover method that is capable of maximizing system capacity by load-balancing based on a handover map established while taking into consideration traffic load of neighbor networks as well as a location of a mobile terminal.

In accordance with an aspect of the present invention, the above and other aspect are accomplished by a vertical handover method for an overlay communication system including a plurality of base stations each providing at least one communication network technology to a mobile terminal. The vertical handover method includes determining if a mobile terminal is located in a measurement region with reference to a vertical handover map in relation to a serving base station; determining base stations that can provide service to the mobile terminal by activating all network interfaces when the mobile terminal is located in a measurement region; selecting one of the base stations as a handover target base station; determining if the mobile terminal is located in a handover region with reference to the vertical handover map; and performing a handover if the mobile terminal is located in a handover region.

In accordance with another aspect of the present invention, the above and other aspects are accomplished by a vertical handover method for an overlay communication system including a plurality of base stations each providing at least one communication network technology to a mobile terminal. The vertical handover method includes periodically measuring a received signal strength and a round trip time to a serving base station; calculating an average distance between a serving base station and the mobile terminal and an average traffic load of the serving base station using the measured received signal strength and round trip time; periodically comparing the average distance and the average traffic load to corresponding threshold values of a vertical handover map; determining whether the average distance and the average traffic load are greater than or equal to a measurement threshold distance and a measurement threshold traffic load, respectively; determining handover candidate base stations by activating all network interfaces if the average distance is greater than or equal to a measurement threshold distance and the average traffic load is greater than or equal to a measurement threshold traffic load; selecting a candidate base station having an optimal condition as a handover target base station among the candidate base stations; and performing a handover to the target base station if the average distance and the average traffic load exceeds a handover threshold distance and a handover threshold traffic load, respectively.

In accordance with another aspect of the present invention the above and other objects are accomplished by a vertical handover method for an overlay communication system including a plurality of base stations each providing at least one communication network technology to a mobile terminal. The vertical handover method includes calculating a distance between the mobile terminal and a serving base station and a traffic load of the serving base station; determining handover candidate base stations if the distance is greater than a first threshold distance or the traffic load is greater than a first threshold traffic load; generating a candidate base station list including the handover candidate base stations; selecting a target base station from the candidate base station list if the distance is greater than a second threshold distance or the traffic load is greater than a second threshold traffic load; and performing a handover to the target base station.

In accordance with another aspect of the present invention, the above and other objects are accomplished by a vertical handover method for an overlay communication system including a plurality of base stations each providing at least one communication network technology to a mobile terminal. The vertical handover method includes building a handover map in the form of a graph in which X axis denotes a distance between the mobile terminal and a serving base station; estimating a current distance between the mobile terminal and the serving base station and a traffic load of the serving base station; projecting a coordinate consisting of the current distance and traffic load to the handover map; and performing a handover-related operation on the basis of a region of the handover map at which the coordinate is positioned.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Certain terminologies are used in the following description for convenience and reference only and are not limiting. In the following detailed description, only the exemplary embodiments of the invention have been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature and not restrictive.

Figure 1:
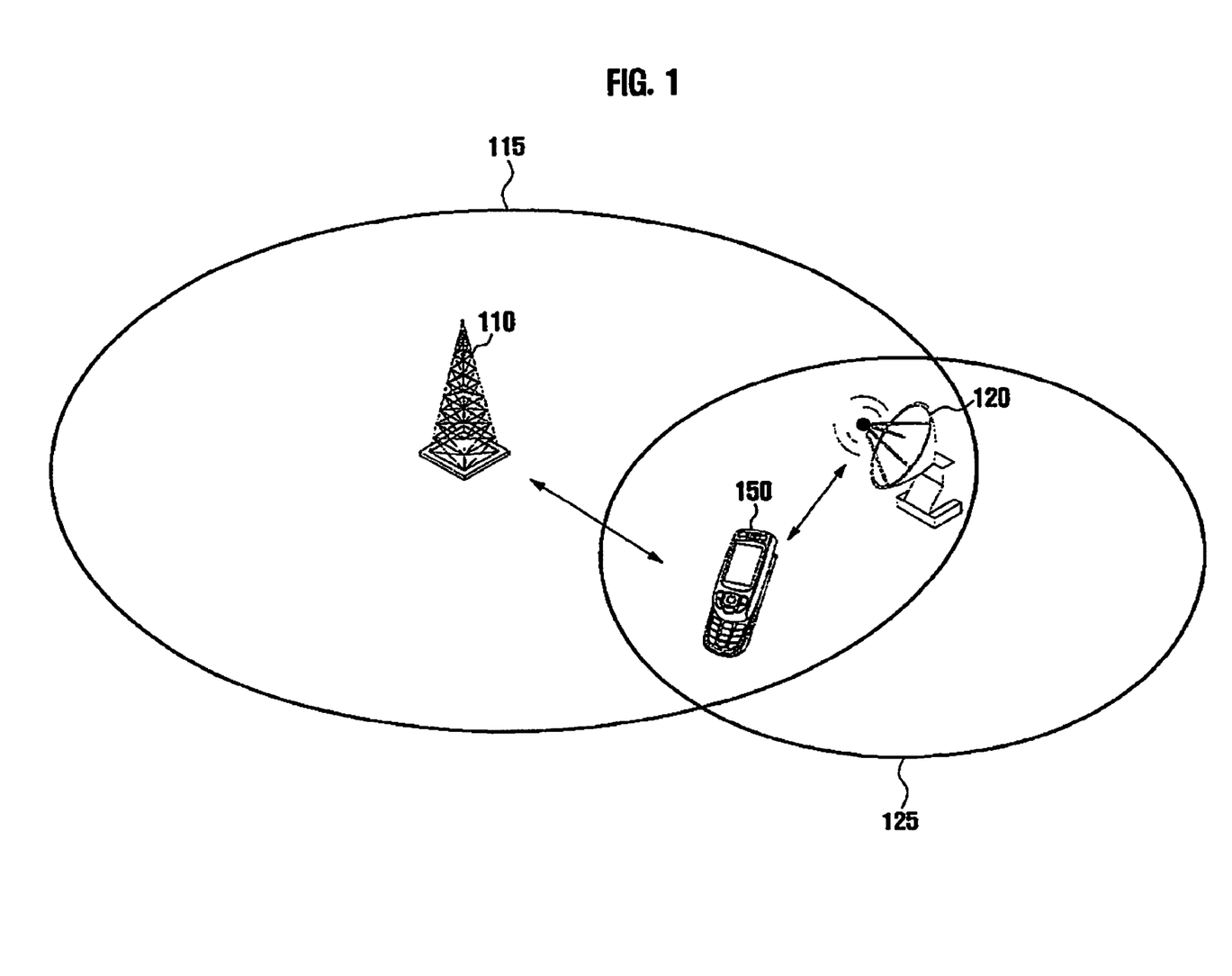
FIG. 1 is a block diagram illustrating an overlay communication system employing a vertical handover method according to an exemplary embodiment of the present invention.

FIG. 1 is a block diagram illustrating an overlay communication system employing a vertical handover method according to an exemplary embodiment of the present invention.

Referring to FIG. 1, a mobile terminal (MT) 150 located in an overlapping area of radio coverage 115 of a first communication system base station (BS) 110 and of radio coverage 125 of a second communication system BS 120. The first and second communication system BSs 110 and 120 provide different communication technologies (for example, General Packet Radio Service (GPRS) and Wireless Local Area Network (WLAN)). In order to communicate with the two BSs 110 and 120, the MT 150 is equipped with two radio interfaces.

Even though two types of communication systems are depicted in FIG. 1 for simplifying the explanation, the present invention is not limited thereto but may be implemented with a plurality of different communication systems. Also, even though the first and second communication systems are implemented with respective BSs in this embodiment, the overlay communication system can be implemented with a single BS supporting more than two communication technologies.

In order to perform a handover with the least packet loss and call drop in the overlay communication system, various factors should be considered. This is because there are many factors (for example, traffic load of the network, movement speed of MT, and communication cost) that influence the handover performance and the system capability. Among them, the traffic load is a significant factor for determining the system throughput.

For example, the mobile terminal is required to determine a handover when the excessive traffic load causes high packet loss and processing delay even though the mobile terminal is located at an area in which the received signal is strong enough to maintain a current connection channel.

In this embodiment, a handover map (H-map) is used for determining a vertical handover by taking into consideration a distance between the BS and the MT and a traffic load of the networks. A structure of the handover map is described with reference to FIGS. 2 and 3.

Figure 2:
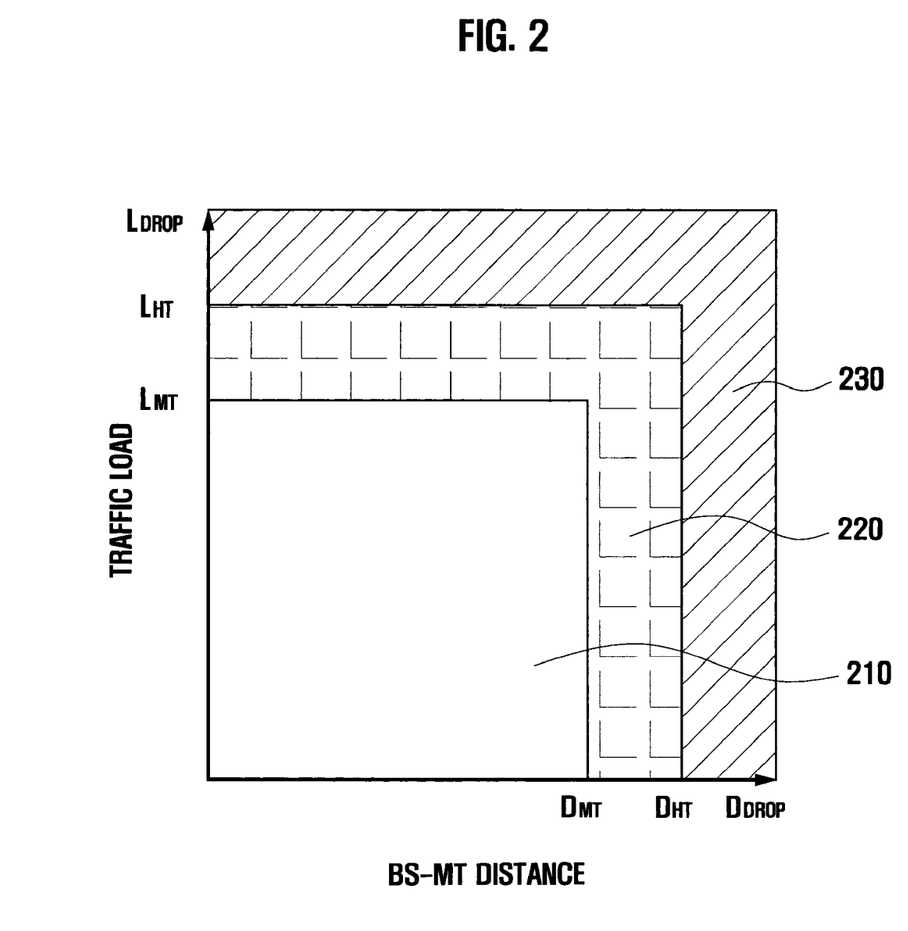
FIG. 2 is a graph illustrating a handover map for use in a vertical handover method according to an exemplary embodiment of the present invention.

FIG. 2 is a graph illustrating a handover map for use in a vertical handover method according to an exemplary embodiment of the present invention.

Referring to FIG. 2, a handover map is represented by a graph of which the X axis denotes a distance (D) between a BS and an MT and the Y axis denotes a traffic load (L) of the serving BS. The MT determines a vertical handover on the basis of the D and the L with reference to the handover map.

The handover map includes a non-handover region 210, a measurement region 220, and a handover region 230 determined by the distance (D) between the BS and the MT and the traffic load (L) of the serving BS. The regions 210, 220, and 230 of the handover map are defined in table 1.

TABLE 1

| Region | Content |
| --- | --- |
| Non-handover region | A stable region in which a handover is not required. |
| Measurement region | A region in which a handover is predicted on the basis of D and L. |
| Handover region | A region in which a handover is determined. |

The handover map defines three regions that are defined with threshold values of two parameters, i.e. D and L.

In FIG. 2, $D_{MT}$ and $L_{MT}$ are measurement region thresholds of a BS-MT distance and a BS traffic load for defining the non-handover region 210, respectively.

If the MT 150 moves far from the serving BS or the serving BS suffers from heavy traffic, a state of the MT 150 transits from the non-handover region 210 to the measurement region 220. In this case, to the MT 150 activates all its network interfaces and scans available BSs. The MT 150 selects one among the scanned BSs as a handover target BS.

$D_{HT}$ and $L_{HT}$ are handover region thresholds of the BS-MT distance and the BS traffic load for defining the measurement region 220, respectively. If the BS-MT distance increases or the traffic load of the serving BS 110 deteriorates from the measurement region 220, the MT 150 performs a vertical handover to the target BS chosen at the measurement region 220 for maintaining the communication channel.

$D_{DROP}$ and $L_{DROP}$ are call drop thresholds of the BS-MT distance and the BS traffic load for defining the handover region 230, respectively. That is, $D_{DROP}$ and $L_{DROP}$ define a maximum BS-MT distance and BS traffic load with which the MT 150 can maintain a connection to the serving BS 110.

If at least one of the BS-MT distance and the traffic load of the serving BS110 exceeds the $D_{DROP}$ and $L_{DROP}$, the connection between the MT 150 and the serving BS 110 is released.

The MT 150 has the handover map and periodically measures D and L so as to determine its channel state on the basis of the measured D and L with reference to the handover map. If it is determined that the channel state is in the measurement region of the handover map, the MT 150 predicts a handover and determines a target BS (e.g. BS 120) through a scanning process. If the D or L increases to be in the handover region 230, the MT 150 performs handover to the target BS 120.

In order to determine the vertical handover, the MT 150 periodically measures D and L. In this embodiment, the handover decision parameters D and L can be estimated without additional elements.

A handover decision parameter measurement will be described hereinafter.

The MT 150 calculates the distance D using the Received Signal Strength (RSS). In this embodiment, a Two-Ray Ground model is used as the channel model for obtaining more accurate distance calculation, relative to a Free Space model.

A current distance $d_{curr}$ between the MT and the serving BS is calculated using the RSS by Equation (1):

$$\text{current distance}(d_{curr}) = \left( \frac{P_t G_t G_r h_t^2 h_r^2}{L \cdot RSS_{curr}} \right)^{\frac{1}{4}} [m] \quad (1)$$

where $P_t$ is a transmit power [dBm] of an antenna, and $G_t$ and $G_r$ are transmit and receive gains [dBi] of respective transmit and receive antennas, $h_t$ and $h_r$ are heights of the respective transmit and receive antennas, L is a system loss [dB], and $RSS_{curr}$ is a received power [dBm].

The call drop distance ($d_{drop}$) is calculated by Equation (2):

$$\text{drop distance}(d_{drop}) = \left( \frac{P_t G_t G_r h_t^2 h_r^2}{L \cdot RSS_{drop}} \right)^{\frac{1}{4}} [m] \quad (2)$$

where $RSS_{drop}$ is a minimum received signal strength for maintaining a connection. If the $RSS_{curr}$ is less than $RSS_{drop}$ the connection between the MT and BS is broken.

However, it is not easy to periodically calculate the BS-MT distance (D), since the MT 150 needs to analyze various parameters (for example, $P_t$, $G_t$, $G_r$, $h_t$, $h_r$, L) in addition to the $RSS_{curr}$.

In this embodiment, the BS-MT distance is normalized so as to derive Equation (3) from Equations (1) and (2).

$$\text{distance}(D) = \frac{d_{curr}}{d_{drop}} = \left[ \frac{RSS_{drop}}{RSS_{curr}} \right]^{\frac{1}{4}}, 0 \leq D \leq 1 \quad (3)$$

As shown in equation (3), the BS-MT distance D can be calculated in accordance with Equations (1) and (2) and can be normalized in a predetermined range. Accordingly, the MT 150 can estimate the BS-MT distance D by measuring only the $RSS_{curr}$ because the $RSS_{drop}$ is a predefined network-specific $RSS_{drop}$. If the BS-MT distance D is close to zero, the MT 150 is located near the BS 110. In contrast, if D is close to 1, the MT 150 is located near a cell boundary of the BS 110. If D exceeds 1, D is set to 1.

The MT 150 estimates the traffic load (L) of the BS 110. In this embodiment, L can be measured without modification of conventional network environment. L can be estimated using an available bandwidth of the network. The MT estimates the available bandwidth using a Round Trip Time (RTT) of a packet. On the basis of the RTT, the MT can recognize a congestion level of the network.

In more detail, the MT 150 measures the current available bandwidth ($BW_{curr}$, using the RRT according to Equation (4).

$$\text{current bandwidth}(BW_{curr}) = \frac{MSS}{RTT_{curr} \cdot \sqrt{p}} \quad (4)$$

where MSS is a maximum size (bytes) of a segment, p is a probability of packet loss, and $RTT_{curr}$ is a current RTT(s)

measured by the MT. Using the $BW_{curr}$ calculated by Equation (4), a minimum available bandwidth is calculated by Equation (5).

$$\text{drop bandwidth}(BW_{drop}) = \frac{MSS}{RTT_{drop} \cdot \sqrt{p}} \quad (5)$$

where $RTT_{drop}$ is a maximum RTT value allowing the connection maintenance. That is, if the $BW_{curr}$ is less than the $BW_{drop}$, the packet loss is very significant such that the MT cannot maintain the connection.

The traffic load L can be measured with a relative value rather than to periodically measure the available bandwidth. Accordingly, the traffic load L can be normalized as Equation (6) using Equations (4) and (5).

$$\text{network load}(L) = \frac{BW_{drop}}{BW_{curr}} = \frac{RTT_{curr}}{RTT_{drop}}, 0 \leq L \leq 1 \quad (6)$$

In Equation (6), the MT calculates the network load L using the two RTT values $RTT_{curr}$ and $RTT_{drop}$. Since the values of the maximum RTTs $RTT_{drop}$ of BSs are known, the MT 150 can estimate the traffic load L of the serving BS by measuring only the $RTT_{curr}$. The closer L is to zero, the more stable the traffic load of the network. The closer L is to 1, the heavier the traffic load of the network. If the traffic load L exceeds 1, L is set to 1.

It is inefficient to use only one of the RSS or the RTT for determining the handover, since unnecessarily frequent handover may occur due to unstable time varying communication environment. For example, if the RSS is abruptly falling or the RTT increases by an obstacle, an unnecessary handover occurs. Such unnecessarily frequent handovers cause degradation of the MT performance and network throughput. Accordingly, the handover must be performed on the basis of reliable channel information.

In order to improve the reliability of the channel information, average RSS and RTT are used. The average RSS and RTT are calculated by Equations (7) and (8), respectively.

$$RSS(N, w_I) = \sum_{j=0}^{N-1} (w_{N-j} \times RSS_{i,j}) \quad (7)$$

$$RTT(N, w_I) = \sum_{j=0}^{N-1} w_{N-j} \times RTT_{i-j} \quad (8)$$

where $RSS(N,w_I)$ and $RTT(N,w_I)$ are the average RSS and average RTT, N is a number of samples, $w_I$ is a weight of $I_{th}$ sample, and $RSS_I$ and $RTT_I$ are respective RSS and RTT measured at time I.

A sum of weights $w_I$ is always 1 and the weight can be assigned in various manners according to the operator's policy. For example, the same weight can be assigned to all the samples, or a greater weight can be assigned to the most recently-taken sample. The different weights can be assigned in a specific distribution pattern. With the differentiated weights allocated, the average value also can be interpreted in different ways. Using the average values, it is possible to improve the reliability of the channel information for the handover decision.

Equations (3) and (6) can be modified by replacing $RSS_{curr}$ and $RTT_{curr}$ with $RSS(N,w_I)$ and $RTT(N,w_I)$, respectively, for enhancing the reliability of the calculation results. Accordingly, the BS-MT distance D and the traffic load L of the network are calculated as Equations (9) and (10).

$$\text{distance}(D) = \left[\frac{RSS_{drop}}{RSS(N, w_I)}\right]^{\frac{1}{4}}, 0 \leq D \leq 1 \quad (9)$$

$$\text{network load}(L) = \frac{RTT(N, w_I)}{RTT_{drop}}, 0 \leq L \leq 1 \quad (10)$$

According to Equations (9) and (10), the MT 150 calculates the current BS-MT distance D and network traffic load L that are used for determining a vertical handoff with reference to the handover map of FIG. 2.

As described above, the handover map of the present invention can be constructed by taking into consideration the network state as well as the mobile state, and the MT can dynamically collect the information for the handover determination without additional network facilities or modification.

An advanced handover map for alleviating the handover traffic concentration will now be described.

Figure 3:
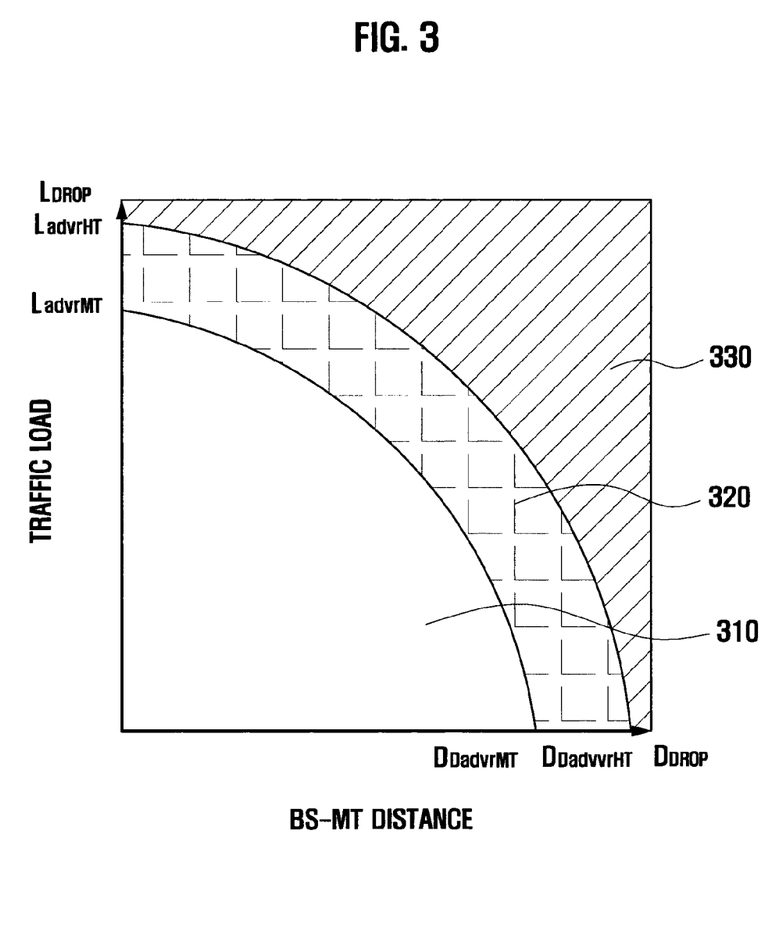
FIG. 3 is a graph illustrating an advanced handover map for use in a vertical handover method according to another exemplary embodiment of the present invention.

FIG. 3 is a graph illustrating an advanced handover map for use in a vertical handover method according to another exemplary embodiment of the present invention.

Referring to FIG. 3, the advance handover map (AH-Map) is also represented by a graph of which the X axis denotes a distance (D) between a BS and an MT and the Y axis denotes a traffic load (L) of the serving BS.

The advanced handover map includes a non-handover region 310, a measurement region 320, and a handover region 330 determined by the distance (D) between the BS and the MT and the traffic load (L) of the serving BS. The regions 310, 320, and 330 of the advanced handover map are defined in Table 1.

In the handover map of the former embodiment of FIG. 2, all the threshold values are adopted for all MTs served in the network such that the handover traffic may be concentrated to the same BS, resulting in degradation of network throughput.

In this embodiment, an advanced handover map is built for adjusting the handover timings of multiple MTs according to the BS-MT distance and the network traffic load (L) for preventing the MTs from starting handovers at the same time.

For example, assuming that a plurality of MTs are located at different distances from a BS and the traffic load of the BS deteriorates to exceed a specific threshold, the handovers are controlled such that to the MT located the furthest distance from the BS is served first. Also, assuming that a plurality of MTs are located at a same distance from a BS and simultaneously move furthest away from the BS while maintaining their connections, the handovers are controlled such that the MT for which the measured network traffic load is the most significant is served first. By differentiating the handover start timings of the MTs, it is possible to preventing the handover traffic from being concentrated to the BS.

In order to minimize the unnecessary handovers, it is preferred to maintain the non-handover region 210 of the former embodiment in this embodiment.

The non-handover region 310 can be defined by an advanced non-handover distance threshold ($D_{advMT}$) and an advanced non-handover traffic load threshold ($L_{advMT}$) to maintain the non-handover region 210 of the former embodiment. $D_{advMT}$ and $L_{advMT}$ are obtained by Equations (11) and (12).

$$D_{advMT} = \frac{2}{\sqrt{\pi}} \times D_{MT} \quad (11)$$

$$L_{advMT} = \frac{2}{\sqrt{\pi}} \times L_{MT} \quad (12)$$

By maintaining the non-handover region of the handover map in the former embodiment using the $D_{advMT}$ and $L_{advMT}$ obtained with Equations (11) and (12), unnecessary handovers can be minimized. That is, when the network traffic load L is very stable or the BS-MT distance D is very short, the handover is delayed.

An advanced handover threshold distance $D_{advHT}$ and an advanced handover threshold traffic load $L_{advHT}$ are calculated by Equations (13) and (14).

$$D_{advHT} = (D_{DROP} - D_{advMT}) \cdot \alpha + D_{advMT} (0 \leq \alpha \leq 1) \quad (13)$$

$$L_{advHT} = (L_{DROP} - L_{advMT}) \cdot \beta + L_{advMT} (0 \leq \beta \leq 1) \quad (14)$$

where $\alpha$ and $\beta$ are input values determined by a system administrator. According to the value of $\alpha$, $D_{advHT}$ is determined between the $D_{advMT}$ and $D_{DROP}$, and $\beta$ determines an $L_{advHT}$ between $L_{advMT}$ and $L_{DROP}$.

The less the input values $\alpha$ and $\beta$ are, the closer the $D_{advHT}$ and $L_{advHT}$ are to $D_{advMT}$ and $L_{advMT}$. In this case, the call drop decreases by the fast handover decision and a number of handovers increases. In contrast, the greater the input values $\alpha$ and $\beta$ are, the fewer the number of handovers and the greater the call drop probability.

Since the different results can be obtained according to the handover thresholds, the advanced handover map should be designed by taking into consideration the two different performances. The $\alpha$ and $\beta$ can have different values. In an example of WLAN having a wide bandwidth and a small coverage area, the $\alpha$ can be set to a value less than that of $\beta$ such that the handover is determined sensitive to the location of the MT. In contrast to a WLAN, a 3G network has a large radio coverage area and a relatively narrow bandwidth. Accordingly, $\beta$ can be preferably set to relatively smaller value such that the handover occurs sensitive to the traffic load, resulting in a fast handover.

In this manner, the advanced handover map can be designed with the input values adaptive to the network environment.

A vertical handover method using the above structured advanced handover map is described hereinafter with reference to FIG. 4.

Figure 4:
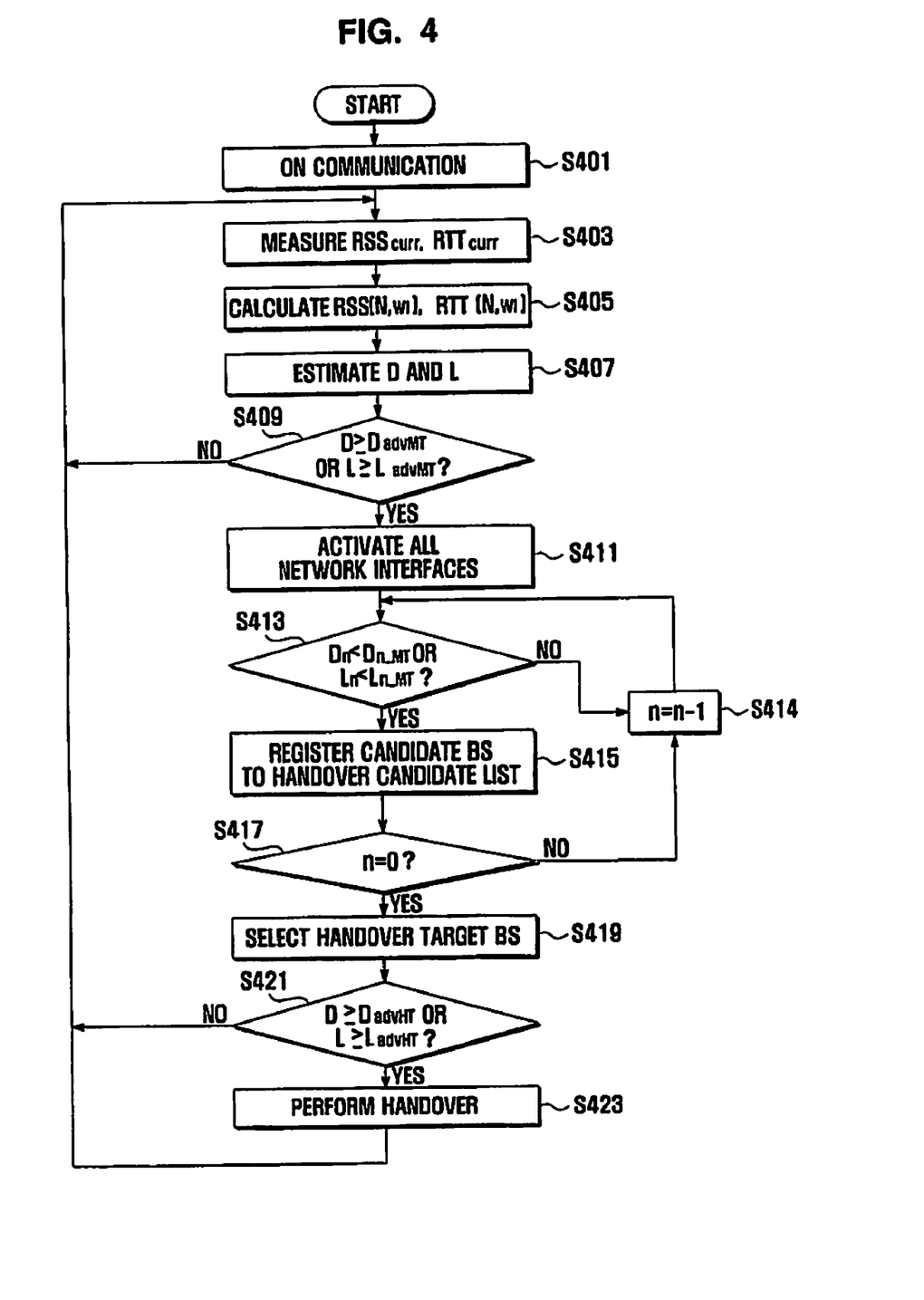
FIG. 4 is a flowchart illustrating a vertical handover for overlay communication system according to an exemplary embodiment of the present invention.

FIG. 4 is a flowchart illustrating a vertical handover for an overlay communication system according to an exemplary embodiment of the present invention.

Referring to FIG. 4, while a session is established (S401), the MT periodically measures the received signal strength $RSS_{curr}$ and the round trip time $RTT_{curr}$ (S403) and calculates the average received signal strength $RSS(N, w_l)$ and the average round trip time $RTT(N, w_l)$ using the N samples of $RSS_{curr}$ and $RTT_{curr}$ (S405). Next, the MT estimates the BS-MT distance D and the network traffic load L on the basis of the $RSS(N, w_l)$ and $RTT(N, w_l)$ (S407).

After D and L are determined, the MT determines whether D is greater than the non-handover distance threshold ($D_{advMT}$) or L is greater than the non-handover traffic load threshold ($L_{advMT}$) (S409).

If it is determined that D is not greater than $D_{advMT}$ or L is not greater than $L_{advMT}$, the MT repeats step S403. If it is determined that D is greater than $D_{advMT}$ or L is greater than $L_{advMT}$, the MT activates all network interfaces (S411) and determines whether a distance ($D_n$) to an $n_{th}$ BS and a traffic load ($L_n$) of the $n_{th}$ BS are less than a non-handover distance threshold ($D_{n\_MT}$) and a non-handover traffic load threshold ($L_{n\_MT}$) for the $n_{th}$ BS, respectively (S413).

If $D_n$ is not less than $D_{n\_MT}$ and $L_n$ is not less than $L_{n\_MT}$, the MT deletes the nth BS from a candidate handover BS list (S414), and performs the same process for determining if the next BS is a candidate BS.

If $D_n$ is less than $D_{n\_MT}$ and $L_n$ is less than $L_{n\_MT}$, the MT registers the BS to the candidate BS list (S415) and then determines whether there is a BS requiring the candidate determination (N=0?) (S417).

If there is no further BS requiring the candidate determination, the MT selects a BS having the least $D_n$ and $L_n$, among the candidate BSs as a handover target BS (S419).

Once the handover target BS is selected, the MT determines whether the current distance D from the serving BS is greater than or equal to the advanced handover distance threshold ($D_{advHT}$), or the traffic load L of the serving BS is greater than or equal to the advanced handover traffic load threshold ($L_{advHT}$) (S421).

If D is greater than or equal to $D_{advHT}$, or if L is greater than or equal to $L_{advHT}$, the MT performs handover to the handover target BS (S423). If neither of the conditions is satisfied, the MT repeats step S403.

The vertical handover method using the advanced handover map is described hereinafter in more detail. The vertical handover method of the present invention can be divided into three phases.

The first phase is a system discovery phase in which the MT detects the need for a handover and determines reachable networks. The second phase is a handover decision in which the MT selects one of the networks. The third phase is a handover execution in which the MT performs a handover to the selected network.

1) System Discovery

In order to discover reachable networks, an MT must activate all of its available network interfaces in an overlay communication system. One of the simple methods of system determination is to maintain the network interfaces in the activated states for monitoring network environments. However, this method is disadvantageous in power consumption. Another system discovery method is to periodically activate and deactivate the network interfaces, but also this method is not expected to give a satisfactory power saving effect.

In order to solve this problem, a system discovery method in which the network interfaces are activated only at a location in which a handover probability is high can be considered. In the vertical handover method of the present invention, the MT activates the network interfaces for detecting reachable networks when handover parameters locate in the measurement region 320 of the advanced handover map of FIG. 3.

The MT locates in the measurement region when the decision parameters satisfy Condition (15).

$$\{[D \geq D_{advMT}] \text{ or } [L \geq L_{advMT}]\} \quad (15)$$

Condition (15) is for determining whether the BS-MT distance D is greater than or equal to the advanced non-handover distance threshold $D_{advMT}$ or the traffic load L of a serving network is greater than or equal to the advanced non-handover traffic load threshold $L_{advMT}$. If this condition is satisfied, the MT activates all of the network interfaces and regards the detected reachable networks as candidate networks. If Condition (15) is not satisfied, the MT periodically measures D and L and compares D and L to corresponding threshold values of the advanced handover map.

The reachable network is of satisfying Condition (16). In Condition (16), it is assumed that the overlay communication consists of n network layers.

$$\{\lfloor D_n < D_{n\_MT} \rfloor \text{ and } \lfloor L_n < L_{n\_MT} \rfloor\} \quad (16)$$

where $D_n$ is a distance between the MT and $n_{th}$ network BS, $L_n$ is a traffic load of the $n_{th}$ network, and $D_{n\_MT}$ and $L_{n\_MT}$ are reachable threshold distance and reachable threshold traffic load of the $n_{th}$ network. The MT can have an advanced handover map per network interface. The MT adds the networks satisfying Condition (16) to the handover candidate list. In the advanced handover map-based vertical handover method of the present invention, the MT activates the network interface only when the handover parameters are in the measurement region, thereby reducing power consumption.

2) Handover Decision

The reachable networks are registered to the handover candidate list which is maintained in the MT. The MT selects one of the candidate networks as a target network. Preferably, the target network is the one having an optimal condition that is presented by Condition (17). In Condition (17), m is a number of the candidate networks.

$$\min\{(D_l + L_l), \ldots, (D_m + L_m)\} \quad (17)$$

where $(D_m + L_m)$ becomes a selection parameter represented by a sum of a distance $(D_m)$ between the $m_{th}$ network and the MT and the traffic load $(L_m)$ of the $m_{th}$ network. The selection parameter is calculated for all the candidate networks and one of the candidate networks having a minimum value is selected as the handover target network.

Although the Dm and Lm have different characteristics, the two parameters can be used in the form of summation since the two parameters are values normalized in accordance with the call drop thresholds. That is, the MT collects the location information of the MT relative to the candidate network BSs and the traffic load information on the candidate network BSs and selects a candidate network which is likely to show the best performance as the handover target network. Since the MT determines the handover target network before starting a handover, it is possible to reduce the delay caused by additional network interface activation process.

3) Handover Execution

After the target network is determined, the MT determines an execution of a handover. At this time, the MT refers to the advanced handover map again and starts a handover if Condition (18) is satisfied.

$$\{[D \geq D_{advHT}] \text{ or } [L \geq L_{advHT}]\} \quad (18)$$

That is, the MT determines whether the distance D between the serving network BS and the MT is greater than or equal to the advanced handover threshold distance $(D_{advHT})$ or the traffic load L of the serving network BS is greater than or equal to the advanced handover threshold traffic load $(D_{advHT})$. If Condition (18) is not satisfied, the MT measures D and L and repeats the above process again.

The above-explained vertical handover method using the advanced handover map is summarized as following.

First, the MT periodically measures $RSS_{curr}$ and $RTT_{curr}$, and estimates D and L on the basis of $RSS_{curr}$ and $RTT_{curr}$.

Next, the MT compares D and L to the corresponding threshold values of the advanced handover map. At this time, if D is greater than or equal to $D_{advMT}$ or L is greater than or equal to $L_{advMT}$, the MT activates all of the network interfaces to discover handover candidate networks. In order to be a handover candidate network, the distance $D_n$ between $n_{th}$ network BS and the MT and the traffic load $L_n$ of the $n_{th}$ BS are less than the reachable threshold distance $D_{n\_MT}$ and the reachable threshold traffic load $L_{n\_MT}$ of the $n_{th}$ BS, respectively.

Next, the MT selects the network having least $D_n$ and $L_n$ among the candidate networks as the target network.

Finally, the MT starts a vertical handover to the target network if D exceeds the advanced handover threshold distance $(D_{advHT})$ or L exceeds the advanced handover threshold traffic $(L_{advHT})$ of the serving network.

As described above, a vertical handover method for an overlay communication system performs a handover in consideration of a distance between a mobile terminal and base stations and traffic loads of the base stations, thereby expecting a load balancing effect and improving a network throughput.

Also, a vertical handover method for an overlay communication system is advantageous in adapting to a network without modification or additional elements.

Also, a vertical handover method for an overlay communication system is advantageous in minimizing packet loss by distributing a traffic load so as to improve a network performance.

Although exemplary embodiments of the present invention are described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A vertical handover method for an overlay communication system including a plurality of base stations each providing at least one communication network technology to a mobile terminal, comprising:

determining if a mobile terminal is located in a measurement region with reference to a vertical handover map in relation to a serving base station;

detecting reachable base stations by activating all network interfaces when the mobile terminal is located in a measurement region;

selecting one of the reachable base stations as a handover target base station;

determining if the mobile terminal is located in a handover region with reference to the vertical handover map; and performing a handover if the mobile terminal is located in a handover region, wherein the vertical handover map is a map configured by a graph in which an X axis denotes a Distance (D) between the serving base station and the mobile terminal, and a Y axis denotes a traffic Load (L) of the serving base station, wherein the measurement region is a region determined by the vertical handover map, wherein the handover region is a region determined by the vertical handover map, and wherein detecting reachable base stations comprises determining if there is a base station satisfying $\{\lfloor D_n < D_{n\_MT} \rfloor$ and $\lfloor L_n < L_{n\_MT} \rfloor\}$, where $D_n$ is a distance between the mobile terminal and $n_{th}$ base station, $L_n$ is a traffic load of $n_{th}$ base station, $D_{n\_MT}$ is a reachable threshold distance, and $L_{n\_MT}$ is a reachable threshold traffic load of the $n_{th}$ base station.

2. The vertical handover method of claim 1, wherein determining if a mobile terminal is located in a measurement region comprises:

determining if $\{[D \geq D_{advMT}] \text{ or } [L \geq L_{advMT}]\}$ is satisfied, where D is a distance between the serving base station and the mobile terminal, L is a traffic load of the serving base station, $D_{advMT}$ is a handover determination distance of the vertical handover map, and $L_{advMT}$ is a handover determination traffic load of the vertical handover map.

3. The vertical handover method of claim 2, wherein D is calculated by $$\text{distance}(D) = \left[\frac{RSS_{drop}}{RSS(N, w_l)}\right]^{\frac{1}{4}}, 0 \leq D \leq 1,$$

where $RSS_{drop}$ is a minimum received signal strength (RSS) for maintaining a connection to the serving base station, $RSS(N, w_l)$ is an average RSS, N is a number of samples, and $w_l$ is a weight of $I_{th}$ sample.

4. The vertical handover method of claim 2, wherein L is calculated by $$\text{network load}(L) = \frac{RTT(N, w_l)}{RTT_{drop}}, 0 \leq L \leq 1,$$

where $RTT_{drop}$ is a maximum round trip time for maintaining a connection to the serving base station, $RTT(N, w_l)$ is an average RTT, N is a number of samples, and $w_l$ is a weight of $I_{th}$ sample.

5. The vertical handover method of claim 1, wherein detecting reachable base station further comprises registering the reachable base station to a handover candidate base station list.

6. The vertical handover method of claim 1, wherein the handover target base station is selected by $\min\{(D_l+L_l), \ldots, (D_m+L_m)\}$, where $D_m$ is a distance between the mobile terminal and $m_{th}$ candidate base station, and $L_m$ is a traffic load of $m_{th}$ candidate base station.

\* \* \* \* \*